(12) United States Patent
Fang et al.

(10) Patent No.: US 10,254,430 B2
(45) Date of Patent: Apr. 9, 2019

(54) DOWNHOLE DEEP TRANSIENT MEASUREMENTS WITH IMPROVED SENSORS

(71) Applicant: BAKER HUGHES INCORPORATED, Houston, TX (US)

(72) Inventors: Sheng Fang, Houston, TX (US);
Sushant M. Dutta, Houston, TX (US);
Gregory B. Itskovich, Houston, TX (US); Steven A. Morris, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/073,480

(22) Filed: Mar. 17, 2016

(65) Prior Publication Data

US 2017/0269252 A1 Sep. 21, 2017

(51) Int. Cl.
*G01V 3/20* (2006.01)
*E21B 49/00* (2006.01)
(Continued)

(52) U.S. Cl.
CPC ............... *G01V 3/20* (2013.01); *E21B 47/01* (2013.01); *E21B 49/00* (2013.01); *G01V 3/28* (2013.01)

(58) Field of Classification Search
CPC .... G01V 2003/084; G01V 3/08; G01V 3/081; G01V 3/083; G01V 3/10; G01V 3/18;
(Continued)

(56) References Cited

U.S. PATENT DOCUMENTS 4,873,488 A * 10/1989 Barber .................. E21B 17/003
324/339
7,046,009 B2 5/2006 Itskovich
(Continued)

FOREIGN PATENT DOCUMENTS

EP 2952675 A2 12/2015

OTHER PUBLICATIONS

PCT Application No.: PCT/US2017/022347—International Preliminary Report on Patentability dated Sep. 18, 2018.
PCT Application No.: PCT/US2017/022347—International Search Report dated Jun. 22, 2017.

*Primary Examiner* — Tung X Nguyen
*Assistant Examiner* — Robert P Alejnikov, Jr.
(74) *Attorney, Agent, or Firm* — Mossman, Kumar & Tyler PC (57) ABSTRACT

Systems, devices, and methods for evaluating an earth formation. Apparatus include an electrically conducting tubular; at least one transmitter configured to propagate an electromagnetic field in the earth formation; and at least one receiver configured to receive an electromagnetic signal resulting from interaction of an electromagnetic field with said earth formation. The at least one transmitter and at least one receiver may employ antenna assemblies comprising: a recess in the conducting tubular defined by at least one radially extending surface substantially perpendicular to a longitudinal axis of the conducting tubular and non-radially extending surfaces; an antenna in the recess; and conductive shielding, the conductive shielding having a conductivity significantly more than a conductivity of the conducting tubular and covering the whole of each of the plurality of radially extending surfaces.

11 Claims, 8 Drawing Sheets

(51) Int. Cl.
*E21B 47/01* (2012.01)
*G01V 3/28* (2006.01)

(58) Field of Classification Search
CPC . G01V 3/26; G01V 3/28; G01V 3/108; G01V 3/12; G01V 3/30; G01V 3/02; G01V 3/105; G01V 3/165; G01V 3/38; G01V 3/088; G01V 3/265
USPC .................................. 324/332–347, 354–357
See application file for complete search history.

(56) References Cited

U.S. PATENT DOCUMENTS

| | | |
|---|---|---|
| 7,150,316 B2 | 12/2006 | Itskovich |
| 7,167,006 B2 | 1/2007 | Itskovich |
| 7,994,790 B2 | 8/2011 | Itskovich et al. |
| 8,035,392 B2 | 10/2011 | Itskovich et al. |
| 8,049,507 B2 | 11/2011 | Rabinovich et al. |
| 8,278,930 B2 | 10/2012 | Itskovich |
| 2007/0216415 A1* | 9/2007 | Clark .................... E21B 47/011 324/338 |
| 2009/0179647 A1* | 7/2009 | Wang ....................... G01V 3/28 324/339 |
| 2010/0097067 A1 | 4/2010 | Synder, Jr. et al. |
| 2011/0316542 A1* | 12/2011 | Frey ......................... G01V 3/26 324/339 |
| 2013/0320985 A1 | 12/2013 | Liu et al. |
| 2015/0285068 A1 | 10/2015 | Morris et al. |

\* cited by examiner

DOWNHOLE DEEP TRANSIENT MEASUREMENTS WITH IMPROVED SENSORS

FIELD OF THE DISCLOSURE

In one aspect, the present disclosure generally relates to methods, systems, and devices for electromagnetic well logging. More specifically, aspects of the present disclosure relate to measurements using transient electromagnetic signals.

BACKGROUND OF THE DISCLOSURE

Geologic formations are used for many purposes such as hydrocarbon and water production. Boreholes are typically drilled into the earth in order to intersect and access the formations.

Electrical earth borehole logging is well known and various device and various techniques have been described for this purpose. Properties of the formation may be estimated by transmitting an electromagnetic (EM) wave in the formation, and receiving related signals at the receiver antennas. Logging instruments may be used to determine the permittivity and electrical conductivity of an earth formation.

Electromagnetic induction resistivity instruments can be used to determine the electrical conductivity of earth formations surrounding a wellbore. These instruments may be outfitted with antennas that are operable as both transmitters and receivers. Transmitter antennas and receiver antennas may have the same characteristics, and an antenna (e.g., coil) may be used as a transmitter at one time and as a receiver at another.

In transient electromagnetic (TEM) methods, a transmitter is configured to initiate currents in surrounding earth formations. The transmitter and receiver may be at the surface or within the wellbore. Induced electric eddy currents diffuse outwards from the proximity of the transmitter into the surrounding formation. At different times related to the excitation transient, information arrives at the measurement sensor (e.g., an induction antenna) predominantly from different investigation depths. Generally, early-time signals predominantly relate to near-zone responses (lesser depths of investigation) and late-time signals predominantly relate to remote-zone responses (greater depths of investigation).

SUMMARY OF THE DISCLOSURE

Aspects of the present disclosure include systems, methods and devices for evaluating an earth formation intersected by a borehole, including estimating a value of a resistivity property of an earth formation intersected by a borehole. Apparatus embodiments may include an electrically conducting tubular conveyable in the borehole; at least one transmitter associated with the conducting tubular configured to propagate an electromagnetic field in the earth formation; and at least one receiver associated with the conducting tubular configured to receive an electromagnetic signal resulting from interaction of an electromagnetic field with said earth formation. The at least one transmitter and at least one receiver may employ at least one of a plurality of antenna assemblies on the conducting tubular. Each antenna assembly may comprise: a recess in the conducting tubular defined by at least one radially extending surface substantially perpendicular to a longitudinal axis of the conducting tubular and non-radially extending surfaces; an antenna in the recess; and conductive shielding, the conductive shielding having a conductivity significantly more than a conductivity of the conducting tubular and covering the whole of each of the plurality of radially extending surfaces. A conductivity significantly more than a conductivity of the conducting tubular is used herein to mean a conductivity at least 30-50 times more conductive than the conducting tubular.

The conducting tubular may be part of a downhole tool and the recess may be defined by a first pair of radially extending surfaces proximate an outer radius of the tool and a second pair of radially extending surfaces proximate the non-radially extending surfaces. The conductive shielding may comprise a first pair of conductive shields covering the first pair of radially extending surfaces and a second pair of conductive shields covering the second pair of radially extending surfaces. An outer pair of conductive shields may be more conductive than an inner pair.

The antenna assembly may include a magnetically transparent sleeve surrounding the antenna and cooperating with the conducting tubular to encapsulate the antenna. The conductive shielding may include a pair of conductive shields interior to the magnetically transparent sleeve. Each of another pair of circumferential conductive shields may abut the magnetically transparent sleeve. The another pair of circumferential conductive shields may be unenclosed by the magnetically transparent sleeve.

Localized magnetic shielding may be installed on portions of at least one of the non-radially extending surfaces. The localized magnetic shielding may comprise at least one of: i) magnetic material (e.g., magnetized material); and ii) highly magnetically permeable material. The antenna may wrap around the localized magnetic shielding. The conductive shielding may include a conductive shield in an annulus between the conducting tubular and the localized magnetic shielding. The conductive shielding may cover all surfaces of the recess not covered by the localized magnetic shielding.

Apparatus embodiments may include at least one processor configured to estimate a parameter of interest of a volume of the earth formation in dependence upon electromagnetic signals received at the receiver. The at least one processor may be configured to estimate a parameter of interest (e.g., a resistivity property) of the earth formation using first and second transient signals to derive a bucked signal substantially unaffected by the tubular. Alternatively, or additionally, the at least one processor may be further configured to estimate the value of the resistivity property of the earth formation by performing an inversion using a 1-D model without using a representation of the conducting tubular.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Aspects of the present disclosure relate to apparatus and methods for electromagnetic induction well logging for evaluating an earth formation, including estimating a value of a resistivity property of an earth formation intersected by a borehole. Some aspects relate particularly to estimating properties of the formation relating to transient electromagnetic (TEM) measurements. The formation may be intersected by a wellbore which is formed by a bottom hole assembly ('BHA') of a drill string. The TEM measurements are taken in the wellbore, and may be used to estimate a parameter of interest. More specifically, the present disclosure relates to techniques enabling deep measurement-while-drilling ('MWD') resistivity measurements suitable for geo-steering and measurements ahead of the bit.

Aspects of the present disclosure mitigate parasitic electrical effects of an electrically conducting tubular (e.g., drillpipe, drill collar) in the tool string (e.g, drillstring) using an improved apparatus for downhole electrical measurements. The apparatus includes traditional measurement instrumentation, including at least one transmitter associated with the conducting tubular configured to propagate an electromagnetic field in the earth formation and at least one receiver associated with the conducting tubular configured to receive an electromagnetic signal resulting from interaction of an electromagnetic field with said earth formation.

The conducting tubular includes a plurality of improved antenna assemblies mitigating parasitic signals from the electrically conducting tubular as described below, which may be used for transmitters, receivers, or both. That is, the at least one transmitter and at least one receiver employ at least one of a plurality of antenna assemblies on the conducting tubular. Some embodiments may include a single transmitter and single receiver, while other embodiments may include a single transmitter and two receivers, a single receiver and two transmitters, or several each of transmitters and receivers which may be arrayed in various configurations as will occur to those of skill in the art.

Parameters of the earth formation may be estimated using signals obtained in the borehole via electrical phenomena. The measurement may include characterizing or recording transient signals in the receiver loop when current is switched off in a pair of transmitters (e.g., transmitter coils) placed at some distance from the receiver.

One aspect of measurement-while-drilling (MWD) applications is the estimation of the distance from the drillbit to an interface in the earth formation that has a resistivity contrast across the interface. The interface may be a bed boundary and/or a fluid interface between a non-conducting fluid (e.g., a hydrocarbon) and a conducting fluid (e.g., brine).

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

As one example, transient electromagnetic (TEM) tools are configured to effect changes in a pair of transmitters to induce a time-dependent current in a formation. Transient signals occur in the receiver antenna, which are induced by the eddy currents in the formation. The induced signal contains information about formation characteristics. Thus, the receiver produces a response indicative of formation characteristics, such as, for example, a resistivity property of the formation. Electronics may be configured to measure the time-dependent transient electromagnetic (TEM) signal induced by the eddy currents in the formation.

In a typical transient induction tool, a magnetic dipole is abruptly reversed at the transmitter loop. For example, current in a transmitter coil drops from its initial value $I_0$ to 0 at the moment t=0. Subsequently, measurements are taken while the rotating tool is moving along the borehole trajectory. The currents induced in the formation and the drillpipe begin diffusing from the region close to the transmitter coil in all the directions surrounding the transmitter. These currents induce electromagnetic field components which can be measured by receivers (e.g., induction coils) placed along the conductive pipe at some distance from the transmitter. U.S. Pat. Nos. 7,167,006; 7,150,316; 7,046,009, which relate to details of TEM measurements, are commonly assigned to the assignee of the present invention and are hereby incorporated by reference herein in their entirety.

It would be desirable to have deep transient measurements (i.e., greater than 30 meters) for geosteering and other purposes. Currently, the main obstacles preventing deep geo-steering beyond 30 meters using transient electromagnetic measurements are caused by the presence of the ubiquitous metal drillpipe; typically, drilling tubular is made of steel. Signal contributions due to the eddy currents in the pipe are parasitic. The signal due to these currents can be much larger (by several orders of magnitude) than the signal from the formation at the time interval where parameters of interest manifest themselves.

The measured transient signal is severely affected by the eddy currents in the pipe that limit resolution of the measurements of the formation parameters, such as, for example, distance to a resistivity boundary. By maximizing the distance between transmitter and receiver it is possible to reduce the influence of the drillpipe signal while increasing the contribution of the signal from the formation. However, such systems result in a limited resolution with respect to the parameters of interest, and the dimensional requirements of such systems (up to 30 meters) may be prohibitive for MWD applications. It would be desirable to mitigate the parasitic signals caused by eddy currents in the drilling tubular in transient field signal detection methods at lesser distances between transmitter and receiver.

In the case of measurements ahead of the bit, positioning of the induction system with respect to the drill bit presents another complication. The first 3-4 meters in the vicinity of the drill bit are not available for transmitter/receiver placement, because equipment supporting the drilling process occupies this space. If it is desirable to look about 5 meters ahead of the bit, the transmitter/receiver system would be separated from the region of interest by 8-9 meters of distance, which exacerbates signal issues It has been known to locate antenna coils in recesses of the tubular, such as for example around a ferrite core. Conductive shielding has been used in conjunction with antenna coils, such as, for example, in an annular space between the coil (or ferrite core) and the reduced diameter tubular. However, a sleeve may be used to protect (and in some embodiments encapsulate) the coil assembly. Although this solution provides many advantages, additional radial surfaces in the electrically conducting tubular are necessary to enable flush mounting of the sleeve with the tubular. These additional radial surfaces exacerbate pipe signal effects and pipe-formation interaction to an unrecognized degree. It has not been previously appreciated the extent to which these outer radial surfaces contribute to parasitic signal effects. Further, until this point, it was considered that only outer edges (e.g., corners) of radially extending surfaces substantially affected the signal. However, as shown herein, implementations in accordance with the present disclosure result in significant reductions in pipe signal.

To attenuate parasitic effects of currents in the drill pipe prior to further processing, aspects of the present disclosure include an advanced antenna assembly mitigating parasitic effects. Each antenna assembly may include at least one recess in the conducting tubular defined by at least one radially extending surface substantially perpendicular to a longitudinal axis of the conducting tubular and non-radially extending surfaces, with an antenna in the recess. The recess may be a circumferential recess. In other embodiments a number of slotted recesses may be azimuthally arrayed.

Importantly, the antenna assembly includes conductive shielding covering the whole of each of the plurality of radially extending surfaces. The conductive shielding has a conductivity significantly greater than a conductivity of the conducting tubular. For example, the conductive shielding may have a conductivity at least 30-50 times greater than a conductivity of the conducting tubular. The end result of these features shows a surprising decrease in parasitic signal attributable to the conductive tubular (e.g., drilling tubular).

Figure 1:
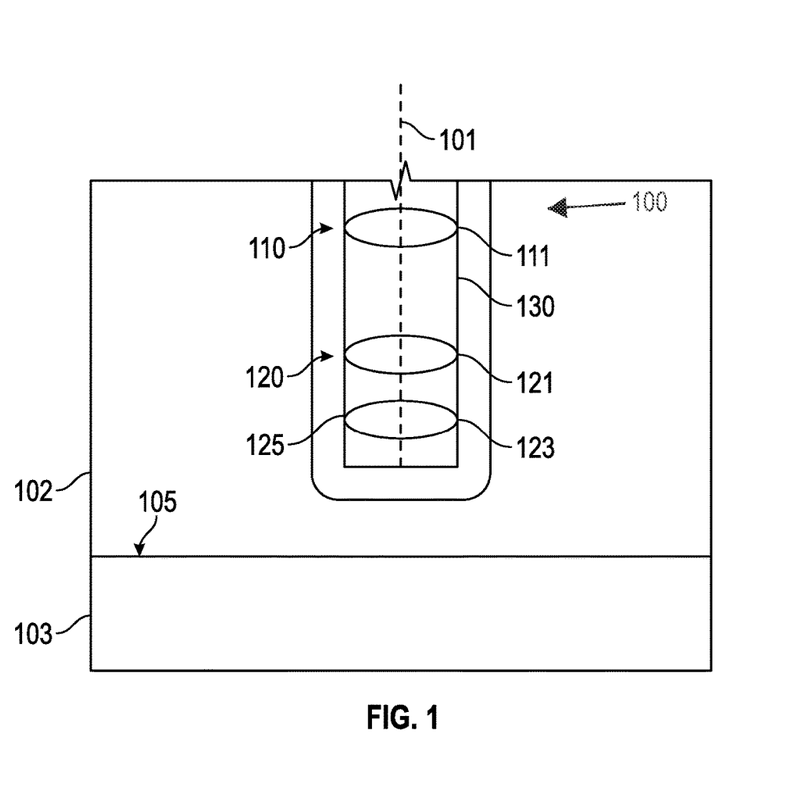
FIG. 1 illustrates tools for use in transient electromagnetic (TEM) logging according to embodiments of the present disclosure.
Figure 2A:
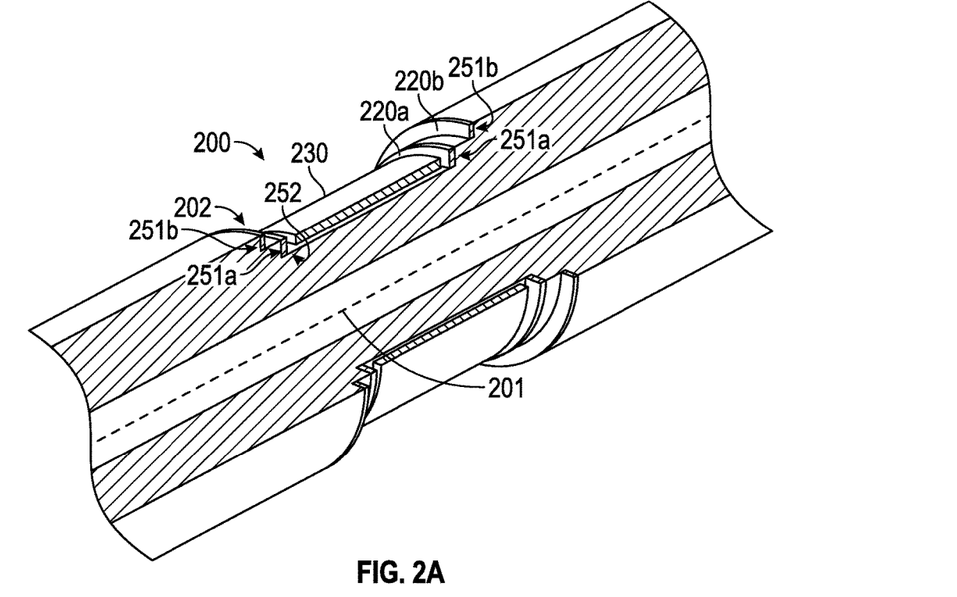
FIGS. 2A-2B show an antenna assembly in accordance with embodiments of the present disclosure.
Figure 2B:
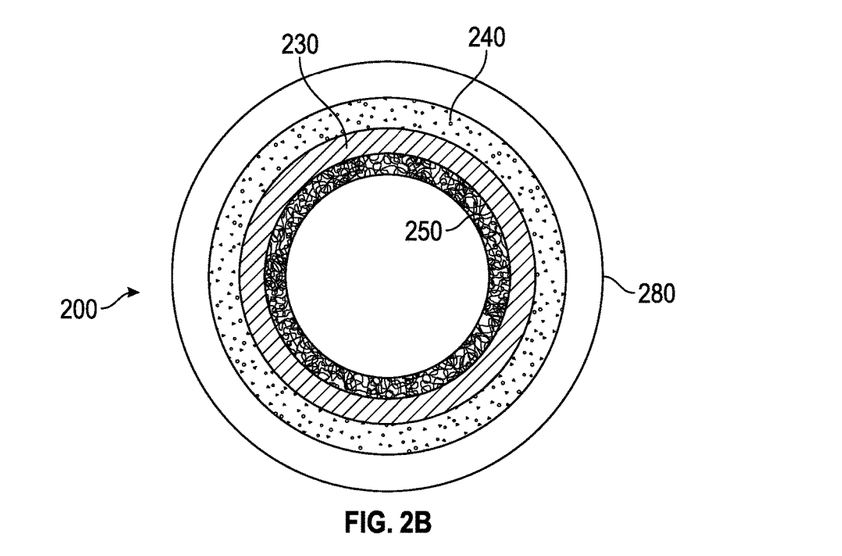

FIG. 1 illustratea tools for use in transient electromagnetic (TEM) logging according to embodiments of the present disclosure. Referring to FIG. 1, tool 100 includes a conducting tubular 130. The tool may include a transmitter 110 and receivers 120 and 125 disposed along tubular 130. Transmitter 110 may include an induction antenna, such as transmitter coil 111, as part of an antenna assembly. Receivers 120 and 125 may each include an induction antenna, such as receiver coils 121, 123, as part of antenna assemblies. Other embodiments may include additional transmitters or receivers. Antenna assemblies are discussed in further detail below with respect to FIG. 2.

The transmitter 110 may be configured to induce a time-dependent current in the formation. For example, the antenna coils 111 may be coupled with a current source by measurement circuitry to produce a time-varying current in the antenna coils 111. The receivers 120, 125 may be configured to convert a time-dependent transient electromagnetic signal induced by the formation responsive to the current into an output signal. The tool 100 may be configured to cause the transient electromagnetic signal by abruptly changing a magnetic moment of the transmitter 110. This may be carried out by switching a current on and off in the transmitter coils to generate pulses.

Switching current in the antenna coil results in magnetization reversal in the magnetic core and change in magnetic dipole moment of the antenna. Some embodiments may use a particular antenna for both transmitting and receiving signals and/or as bucking coils or other bucking components.

Many variations in transmitter and receiver configurations may be successfully employed. Transmitters and receivers may vary in number, location (e.g., with respect to the tool, to one another, to the drill bit, and so on) and orientation (e.g., transverse, longitudinal, tilted, etc.).

In operation, tool 100 is configured to effect changes in the transmitters to induce a time-dependent current in the formation. Transient signals occur in the receiver antennas that are induced by the formation responsive to the current. The induced signal contains information about formation characteristics. Thus, the receiver produces a response indicative of formation characteristics, such as the parameter of interest. A processor is configured to measure the time-dependent transient electromagnetic (TEM) signal induced by the formation.

TEM tool 100 lies next to a formation interface 105. Transmitter 110 and receivers 120 and 125 lie along a common axis 101 that is vertically positioned in the upper half-space 102 perpendicular to the interface and is separated by a distance from the interface. In this example, the transmitter-receiver spacing is 2 and 4 meters, respectively. The term "interface" includes a fluid interface between two different fluids in an earth formation (e.g., a fluid front) as well as a boundary between two different geologic or stratigraphic intervals in the earth (e.g., distance to bed). Examples following use distance to bed for convenience of illustration, but it should be readily apparent that embodiments wherein distance to an interface of a different type is estimated are within the scope of the disclosure. The upper half-space 102 has a resistivity of 50 Ω-m and the remote formation (lower half-space) 103 is shown to have a resistivity of 1 Ω-m. It should be noted that the coaxial transmitter-receiver configuration shown herein is not to be construed as a limitation and any suitable arrangement including but not limited to an arrangement having a transverse transmitter and/or a transverse receiver may be used.

Figure 2C:
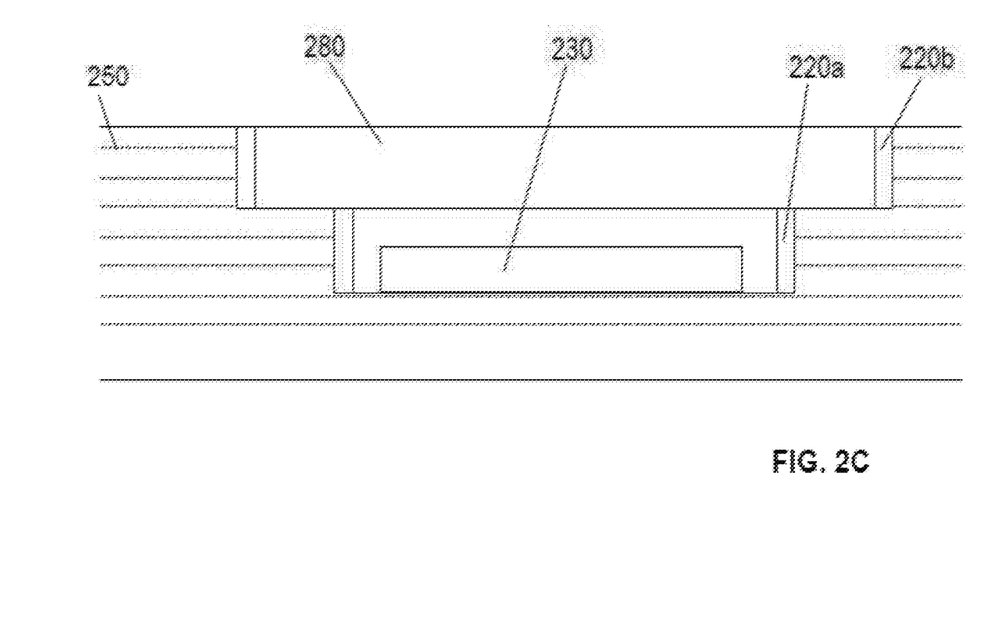

FIGS. 2A-2C show an antenna assembly 200 in accordance with embodiments of the present disclosure. FIG. 2A shows a schematic cut-away view of a tool in accordance with embodiments of the present disclosure. FIG. 2B shows a cross-section of tool 210 showing antenna assembly 200. FIG. 2C shows a partial cross-sectional view of tool 210 showing antenna assembly 200.

Tool 210 comprises an antenna assembly 200 comprising a wound coil antenna 240 installed on a conducting tubular 250 (e.g., steel drill collar). The recess 202 maybe defined by the surfaces of the tubular. A protective sleeve 280 encloses antenna 240. Note wound coil antenna 240 and protective sleeve 280 are omitted from FIG. 2A to avoid confusion.

The antenna assembly 200 comprises a recess in the conducting tubular 250 defined by at least one radially extending surface 251 substantially perpendicular to a longitudinal axis of the conducting tubular and non-radially extending surfaces 252. Radially extending surfaces 251a are proximate the antenna, while radially extending surfaces 251b are proximate the protective sleeve 280. The wound coil antenna 240 is installed in the recess 202—that is, proximate the conducting tubular 250 at a radius from the longitudinal axis 201 of the tool 210 less than the general tool radius. So in FIGS. 2A & 2B, the recess 202 is defined by surfaces including a first pair of radially extending surfaces proximate an outer radius of the tool and a second pair of radially extending surfaces proximate the non-radially extending surface 252.

The antenna assembly 200 includes conductive shielding 220 covering the whole of each of the plurality of radially extending surfaces. The conductive shielding 220 has a conductivity significantly more than a conductivity of the conducting tubular 250. For example, the conductive shielding 220 may have a conductivity at least 30 to 50 times the conductivity of the conducting tubular 250. Primary conductive shielding 220a proximate the antenna 240 is interior to the protective sleeve 280 and made of copper. Secondary conductive shielding 220b is proximate the protective sleeve 280 and may have a surface forming a portion of an exterior surface of the tool. Thus, secondary conductive shielding 220b may be exposed to downhole fluids. The secondary conductive shielding 220b may be more conductive than the primary conductive shielding 220a. The secondary conductive shielding 220b may be made from beryllium-copper (e.g., BF65).

Mechanically rugged slotted metal sleeves having elongated slots have traditionally been used for outer protection of electromagnetic sensors ('EM sensors') in downhole applications, to prevent the environment of the borehole from damaging the sensors. In some ways, this type of sleeve may not be ideal for use with multi-axis or transient EM sensors. Slots in the metal sleeve are oriented parallel to the axis of sensitivity of the sensor. Further, when used for transient EM measurement ('TEM'), a slotted metal sleeve has disadvantages, including production of parasitic signals in the receiver. Suppression or cancellation of these signals is problematic. However, in some non-TEM applications, a metallic sleeve may have advantages recommending its use with the system described herein, or the sleeve may employ conductive shielding, as shown with respect to the recess above, or other measures making the sleeve magnetically transparent.

Returning to FIG. 2B, the use of a magnetically transparent sleeve for the protective sleeve 280 mitigates the issues inherent in the slotted metal sleeves of the prior art. The magnetically transparent implementation of protective sleeve 280 may be made of thermoplastics (such as those in polyaryletherketone ('PAEK') family), other polymers, resins, or composite materials. In one implementation, polyetheretherketone ('PEEK') may be used. By "magnetically transparent" it is meant that the sleeve is substantially non-conductive, such that electrically it will not produce parasitic signals in the receiver sufficient to prevent useful employment of the instrument in detecting TEM signals or that it is made of non-conductive or substantially non-conductive materials.

"Substantially non-conductive material," as used herein, is defined as a material having a volume resistivity greater than $10^{-2}$ ohm-meters and may include composite materials (e.g., carbon-reinforced composite materials), powdered metals, and so on. "Non-conductive materials," as used herein, is defined as materials having a volume resistivity greater than $10^3$ ohm-meters.

Antenna assembly 200 may include localized magnetic shielding 230 on portions of at least one of the non-radially extending surfaces 252, around which the antenna 240 may wrap. The localized magnetic shielding may comprise either or both of: i) magnetic (e.g., magnetized) material; and ii) highly magnetically permeable material.

Magnetic shielding 230 may be defined as a soft magnetic material of high (~1000 H·m−1) permeability, such as, for example, ferrite. The magnetic shielding may reduce the intensity of the eddy currents in the pipe and, as a result, diminish the parasitic effect from the pipe.

Figure 3A:
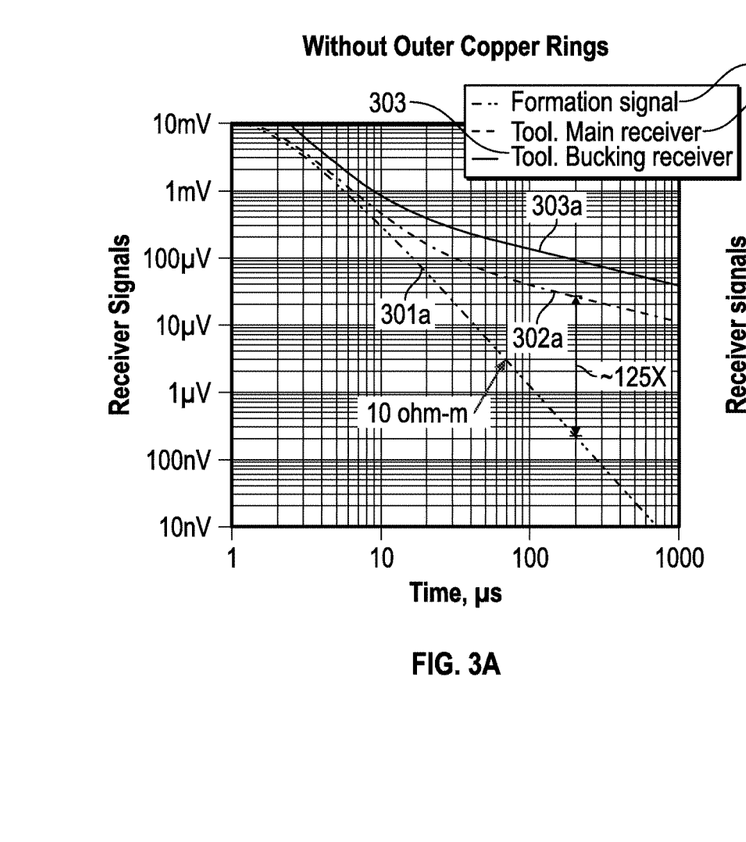
FIGS. 3A & 3B illustrate a comparison between modeled responses of a traditional coaxial (ZZ) tool and a tool in accordance with aspects of the present disclosure.
Figure 3B:
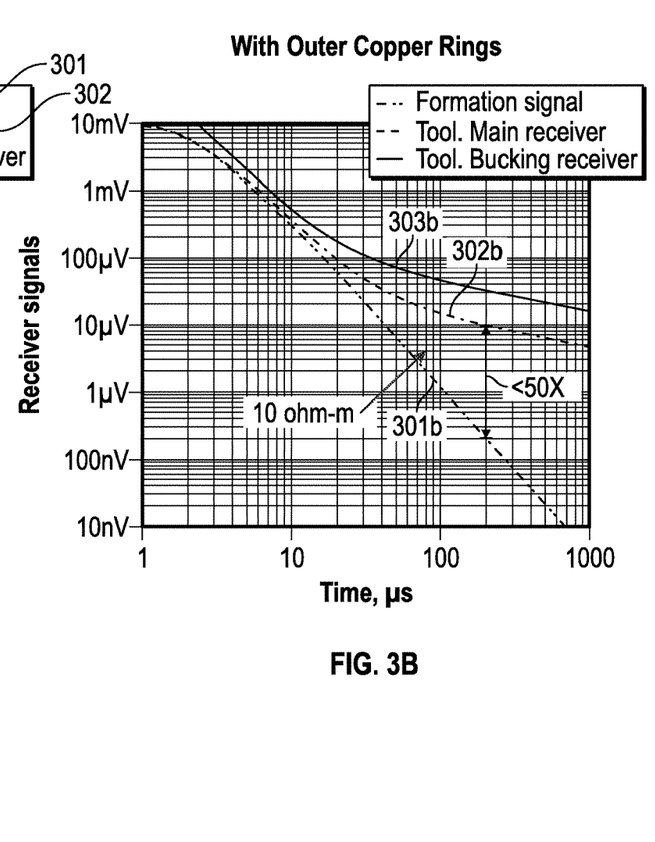

FIGS. 3A & 3B illustrate a comparison between modeled responses of a traditional coaxial (ZZ) tool and a tool in accordance with aspects of the present disclosure. The use of the antenna assembly of the present disclosure reduces the pipe signal dramatically. The receiving coils are separated by 2 meters and the transmitting coil is placed at a distance of 2 meters from the closest receiver.

Referring to FIG. 3A, the pipe signal in the main receiver 302a is 125 times the ideal formation response (formation signal 301a) at 200 μs for the conventional tool. Referring to FIG. 3B, in comparison with the response from the tool of FIGS. 2A & 2B, where the pipe signal in the main receiver 402b is only 50 times the ideal formation response (formation signal 401b) at 200 μs, there is an improvement of signal by approximately 2.5 times. The response for the bucking receiver for both cases (403a, 403b) is also shown.

Figure 4A:
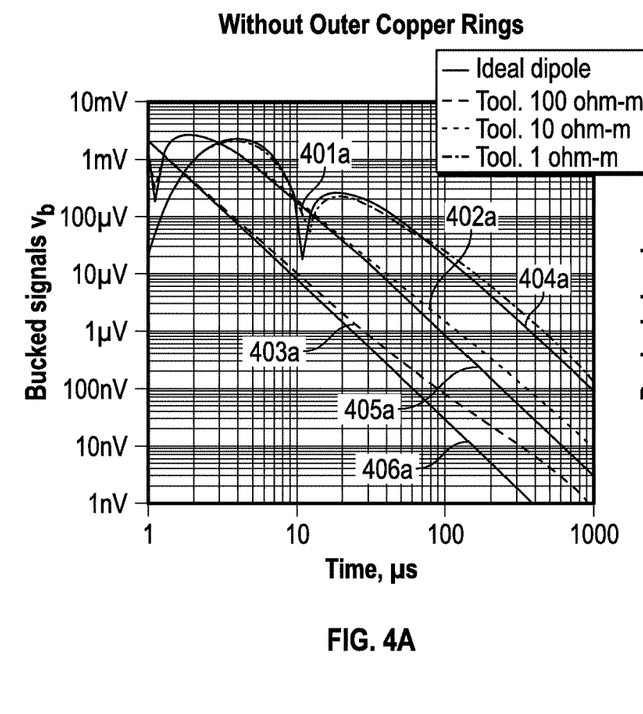
FIGS. 4A and 4B show bucked signal responses illustrating the reduction of pipe-formation interaction for the tool in accordance with embodiments of the present disclosure in comparison with a traditional tool.
Figure 4B:
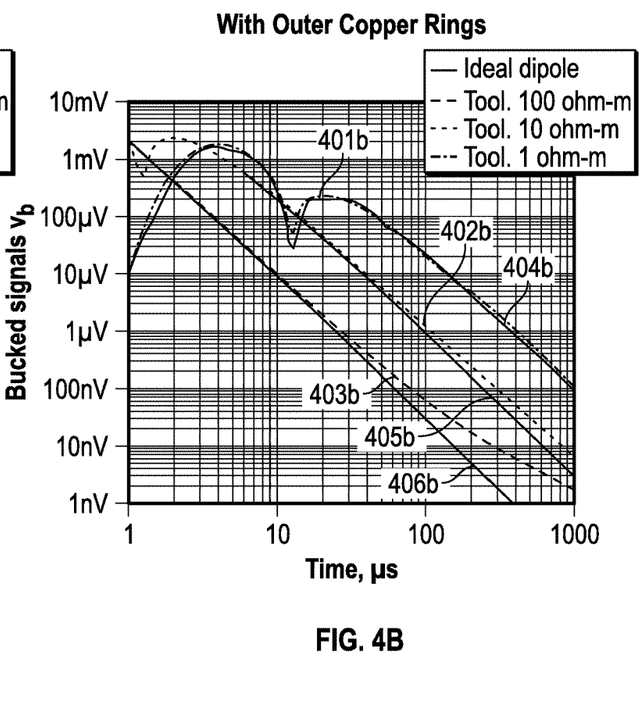

FIGS. 4A and 4B show bucked signal responses illustrating the reduction of pipe-formation interaction for the tool in accordance with embodiments of the present disclosure in comparison with a traditional tool. Here the signal from the pipe is additionally suppressed by combining responses at the 2-meter and 4-meter receiver signals using a bucking coefficient K derived from previous signals. FIG. 4A illustrates bucked responses of a conventional coaxial (ZZ) tool for a conventional tool. Signals are shown for volumes of an earth formation having resistivities of 1 ohm-m (401a), 10 ohm-m (402a), 100 ohm-m (403a) in comparison with the ideal dipole responses for an earth formation having resistivities of 1 ohm-m (404a), 10 ohm-m (405a), 100 ohm-m (406a). FIG. 4B illustrates bucked responses of a coaxial (ZZ) tool of the present disclosure. Signals are shown for volumes of an earth formation having resistivities of 1 ohm-m (401b), 10 ohm-m (402b), 100 ohm-m (403b) in comparison with the ideal dipole responses for an earth formation having resistivities of 1 ohm-m (404b), 10 ohm-m (405b), 100 ohm-m (406b). As can be seen from FIG. 4B, the bucked signals are closer to coinciding with the ideal dipole for most of the time in interval of interest when the improved antenna assembly of the present disclosure is used.

Figure 5A:
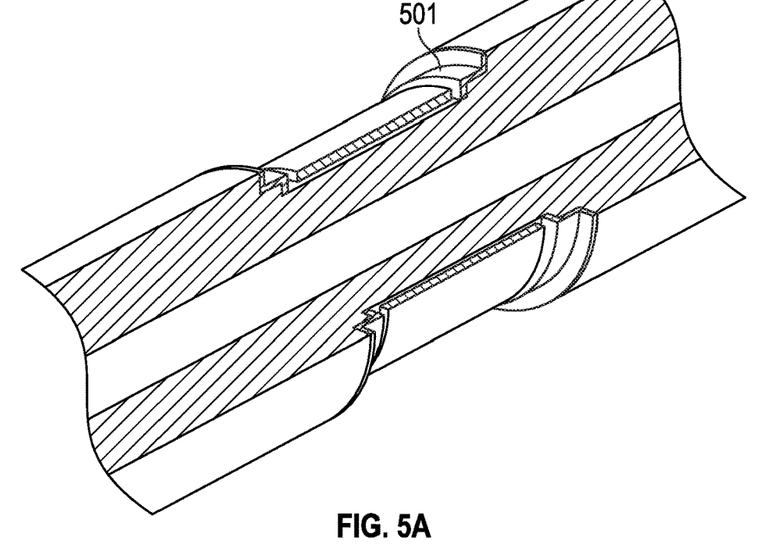
FIG. 5A and FIG. 5B illustrate further embodiments of the present disclosure.
Figure 5B:
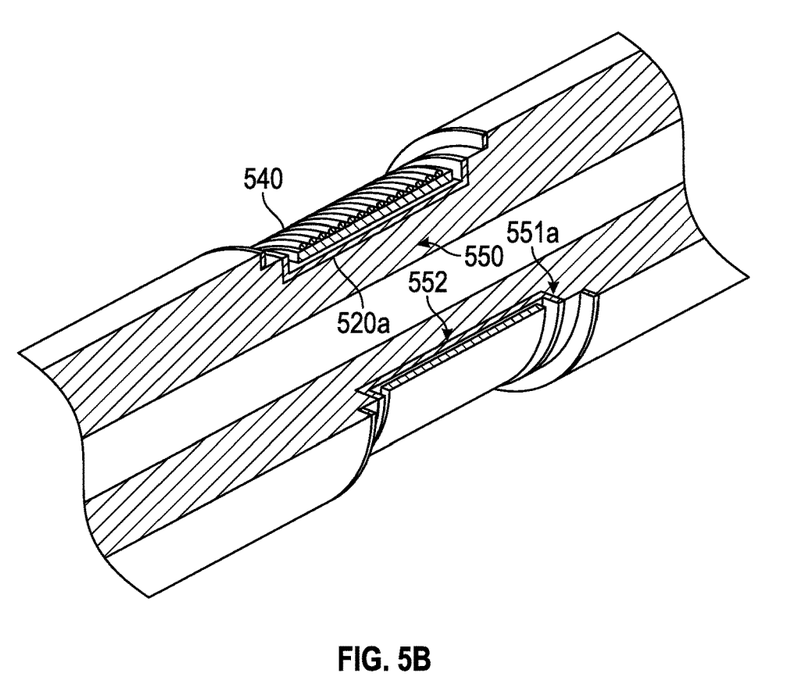

FIGS. 3A & 3B illustrate a comparison between modeled responses of a traditional coaxial (ZZ) tool and a tool in accordance with aspects of the present disclosure. The use of the antenna assembly of the present disclosure reduces the pipe signal dramatically. FIGS. 4A and 4B show bucked signal responses illustrating the reduction of pipe-formation interaction for the tool in accordance with embodiments of the present disclosure in comparison with a traditional tool. FIG. 5A & FIG. 5B illustrate further embodiments of the present disclosure. Although embodiments were described with respect to FIGS. 2A & 2B wherein the conductive shielding comprises a first pair of conductive shields covering the first pair of radially extending surfaces and a second pair of conductive shields covering the second pair of radially extending surfaces, in particular embodiment conductive shielding may cover all surfaces 501 of the recess not covered by the localized magnetic shielding, as shown in FIG. 5A. In other embodiments, conductive shielding 520a may extend along an annulus formed by the antenna 540 (and magnetic shield 530) and the reduced diameter tubular 550. Referring to FIG. 5B, conductive shielding 520a separates antenna 540 and magnetic shield 530 from surfaces 551a and 552 of reduced diameter tubular 550.

Figure 6:
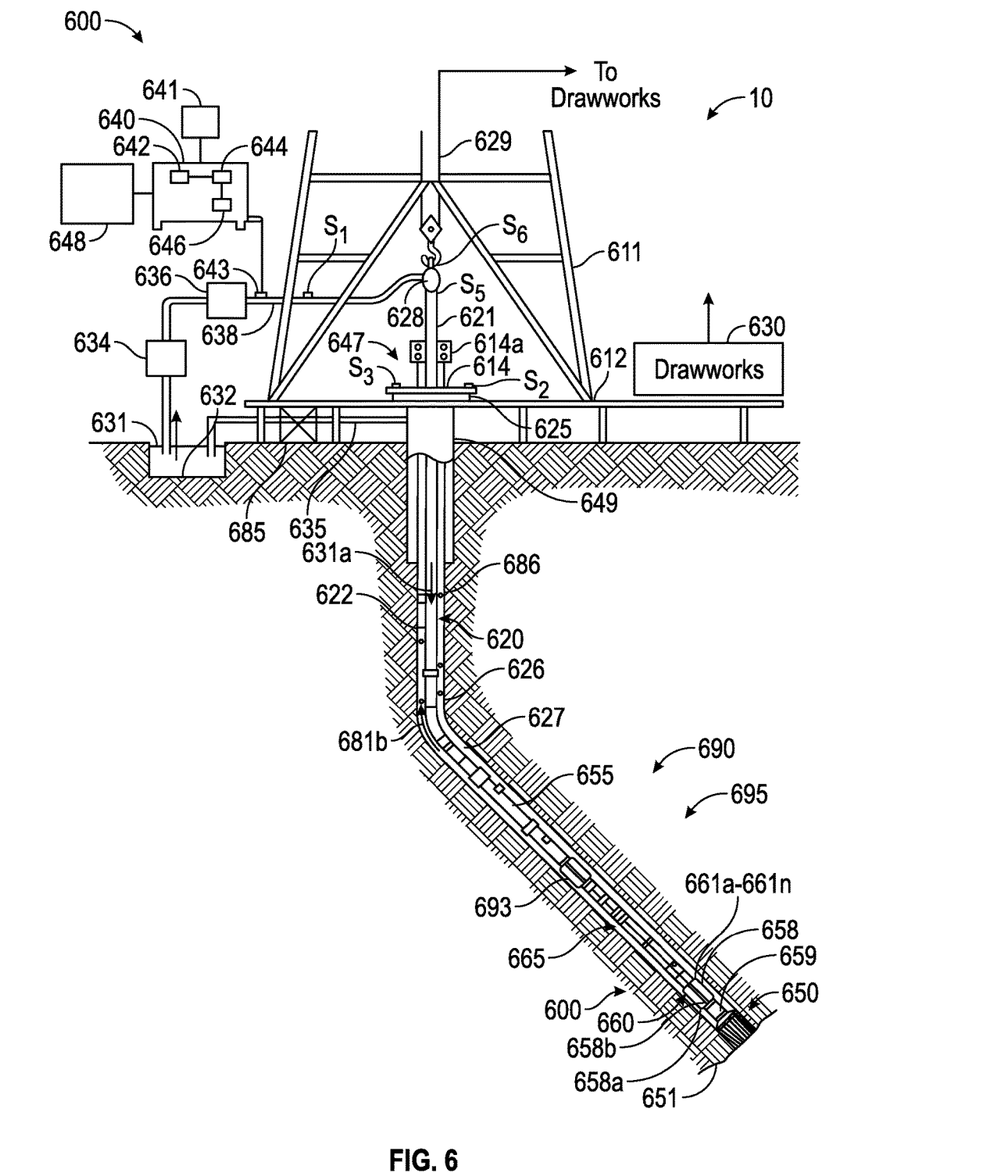
FIG. 6 is a schematic diagram of an example drilling system in accordance with embodiments of the disclosure.

FIGS. 3A & 3B illustrate a comparison between modeled responses of a traditional coaxial (ZZ) tool and a tool in accordance with aspects of the present disclosure. The use of the antenna assembly of the present disclosure reduces the pipe signal dramatically. FIGS. 4A and 4B show bucked signal responses illustrating the reduction of pipe-formation interaction for the tool in accordance with embodiments of the present disclosure in comparison with a traditional tool. FIG. 5A & FIG. 5B illustrate further embodiments of the present disclosure. FIG. 6 is a schematic diagram of an example drilling system 10 in accordance with embodiments of the disclosure. FIG. 6 shows a drill string 620 that includes a bottomhole assembly (BHA) 690 conveyed in a borehole 626. The drilling system 10 includes a conventional derrick 611 erected on a platform or floor 612 which supports a rotary table 614 that is rotated by a prime mover, such as an electric motor (not shown), at a desired rotational speed. A tubing (such as jointed drill pipe 622), having the BHA 690, attached at its bottom end extends from the surface to the bottom 651 of the borehole 626. A drill bit 650, attached to BHA 690, disintegrates the geological formations when it is rotated to drill the borehole 626. The drill string 620 is coupled to a drawworks 630 via a Kelly joint 621, swivel 628 and line 629 through a pulley. Drawworks 630 is operated to control the weight on bit ("WOB"). The drill string 620 may be rotated by a top drive (not shown) instead of by the prime mover and the rotary table 614. Alternatively, a coiled-tubing may be used as the tubing 622. A tubing injector 614a may be used to convey the coiled-tubing having the drilling assembly attached to its bottom end. The operations of the drawworks 630 and the tubing injector 614a are known in the art and are thus not described in detail herein.

A suitable drilling fluid 631 (also referred to as the "mud") from a source 632 thereof, such as a mud pit, is circulated under pressure through the drill string 620 by a mud pump 634. The drilling fluid 631 passes from the mud pump 634 into the drill string 620 via a desurger 636 and the fluid line 638. The drilling fluid 631a from the drilling tubular discharges at the borehole bottom 651 through openings in the drill bit 650. The returning drilling fluid 631b circulates uphole through the annular space 627 between the drill string 620 and the borehole 626 and returns to the mud pit 632 via a return line 635 and drill cutting screen 685 that removes the drill cuttings 686 from the returning drilling fluid 631b. A sensor S1 in line 638 provides information about the fluid flow rate. A surface torque sensor S2 and a sensor S3 associated with the drill string 620 respectively provide information about the torque and the rotational speed of the drill string 620. Tubing injection speed is determined from the sensor S5, while the sensor S6 provides the hook load of the drill string 620.

Well control system 647 is placed at the top end of the borehole 626. The well control system 647 includes a surface blow-out-preventer (BOP) stack 615 and a surface choke 649 in communication with a wellbore annulus 627. The surface choke 649 can control the flow of fluid out of the borehole 626 to provide a back pressure as needed to control the well.

In some applications, the drill bit 650 is rotated by only rotating the drill pipe 622. However, in many other applications, a downhole motor 655 (mud motor) disposed in the BHA 690 also rotates the drill bit 650. The rate of penetration (ROP) for a given BHA largely depends on the WOB or the thrust force on the drill bit 650 and its rotational speed.

A surface control unit or controller 640 receives signals from the downhole sensors and devices via a sensor 643 placed in the fluid line 638 and signals from sensors S1-S6 and other sensors used in the system 10 and processes such signals according to programmed instructions provided to the surface control unit 660. The surface control unit 640 displays desired drilling parameters and other information on a display/monitor 641 that is utilized by an operator to control the drilling operations. The surface control unit 640 may be a computer-based unit that may include a processor 642 (such as a microprocessor), a storage device 644, such as a solid-state memory, tape or hard disc, and one or more computer programs 646 in the storage device 644 that are accessible to the processor 642 for executing instructions contained in such programs. The surface control unit 640 may further communicate with a remote control unit 648. The surface control unit 640 may process data relating to the drilling operations, data from the sensors and devices on the surface, and data received from downhole; and may control one or more operations of the downhole and surface devices. The data may be transmitted in analog or digital form.

The BHA 690 may include a tool 600 configured for performing transient electromagnetic (TEM) measurements. The BHA 690 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 695 surrounding the BHA 690. For convenience, all such sensors are generally denoted herein by numeral 665. The BHA 690 may further include a variety of other sensors and devices 659 for determining one or more properties of the BHA 690, such as vibration, bending moment, acceleration, oscillations, whirl, stick-slip, weight-on-bit, fluid flow rate, pressure, temperature, rate of penetration, azimuth, tool face, drill bit rotation, etc.

The BHA 690 may include a steering apparatus or tool 658 for steering the drill bit 650 along a desired drilling path. In one aspect, the steering apparatus may include a steering unit 660, having a number of force application members 661a-661n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 658 having a bent sub and a first steering device 658a to orient the bent sub in the wellbore and the second steering device 658b to maintain the bent sub along a selected drilling direction. The steering unit 658, 660 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 620 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 693 on the BHA 690. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 642 can process the surface measured data, along with the data transmitted from the downhole processor, to evaluate the formation. While a drill string 620 is shown as a conveyance device for tool 600, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 10 may include a bottomhole assembly and/or sensors and equipment for implementation of embodiments of the present disclosure on either a drill string or a wireline.

A point of novelty of the system illustrated in FIG. 6 is that the surface processor 642 and/or the downhole processor 693 are configured to perform certain methods (discussed below) that are not in the prior art. Surface processor 642 or downhole processor 693 may be configured to control steering apparatus 658, mud pump 634, drawworks 630, rotary table 614, downhole motor 655, other components of the BHA 690, or other components of the drilling system 10. Surface processor 642 or downhole processor 693 may be configured to control sensors described above and to estimate a property of the earth formation according to methods described herein.

Control of these components may be carried out using one or more models using methods described below. For example, surface processor 642 or downhole processor 693 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like.

Reference information accessible to the processor may also be used. In some general embodiments, surface processor 642, downhole processor 693, or other processors (e.g., remote processors) may be configured to operate the TEM tool 600 to induce and measure TEM signals.

Figure 7:
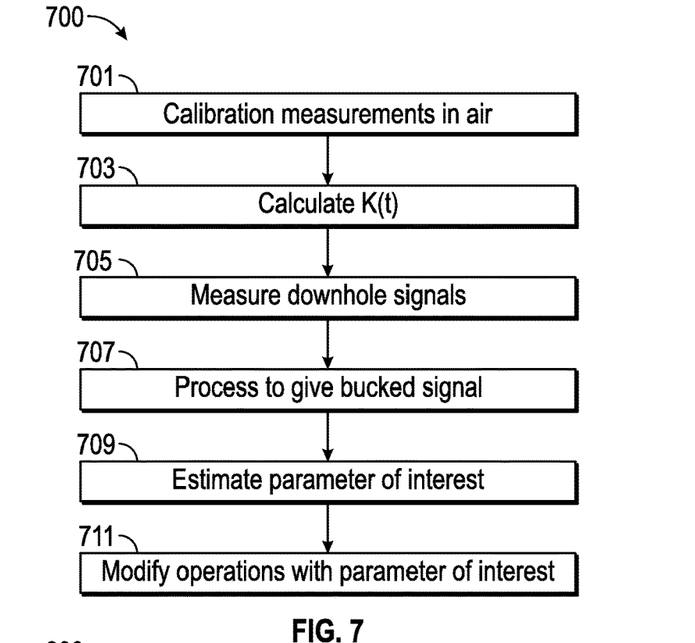
FIG. 7 illustrates a method for estimating a property of the earth formation in accordance with embodiments of the present disclosure.

FIG. 7 illustrates a method 700 for estimating a property of the earth formation in accordance with embodiments of the present disclosure. Transient calibration measurements are made 701 in a homogenous zone such as in air (i.e., with no formation around) and two signals $C_1(t)$ and $C_2(t)$, attributable to R1 and R2, respectively, are received. At step 703, a time-dependent bucking coefficient may be estimated using a processor. For example, the bucking coefficient may be calculated as $$K(t)=C_2(t)/C_1(t) \qquad (1)$$

using the processor. Alternatively, the coefficient may be estimated by minimizing the difference between $C_1(t)$ and $C_2(t)$ in a least square sense. For example, estimating K(t) may be carried out by finding $$K(t) = k(t)\frac{M_1}{M_2}\frac{L_2^3}{L_1^3}$$

corresponding to $$\left|\sum_{i=1}^{N}\left(C_1(t_i) - k(t_i)\frac{M_1}{M_2}\frac{L_2^3}{L_1^3}C_2(t_i)\right)^2\right|_{min}, \qquad (2)$$

wherein $C_1$ is the first time-dependent TEM signal and $C_2$ is the second time-dependent TEM signal, $M_1$ is a magnetic moment of the first transmitter, $M_2$ is a magnetic moment of the second receiver, $L_1^3$ is the distance from the first receiver to the transmitter and $L_2^3$ is the distance from the second receiver to the transmitter, and N is a number of measurement samples at corresponding discrete times $t_i$. As another alternative, the bucking coefficient can be estimated according to the formula:

$$K(t) = \frac{M_1}{M_2}\frac{L_2^3}{L_1^3}, \qquad (3)$$

wherein $M_1$ is a magnetic moment of the first receiver, $M_2$ is a magnetic moment of the second receiver, $L_1^3$ is the distance from the first receiver to the transmitter and $L_2^3$ is the distance from the second receiver to the transmitter.

Steps 701 and 703 comprise a bucking mode. At step 705, downhole transient measurements are made and two signals $S_1(t)$ and $S_2(t)$ are acquired, which correspond to receivers R1 and R2. The measurements may be made sequentially, or the measurement corresponding to R1 may be taken during the measurement corresponding to R2 (e.g., simultaneously). Next, a processor is used to process the two signals $S_1(t)$ and $S_2(t)$ to estimate the differential (bucked) signal. This may be carried out at step 707 according to the equation $$\Delta S(t)=S_2(t)-K(t)\cdot S_1(t). \qquad (4)$$

Although, the first time-dependent TEM signal and the second time-dependent TEM signal include reduced parasitic signal contributions from the tubular, the bucking coefficient K(t) is configured such that the bucked signal (e.g., ΔS(t)) is substantially free of parasitic signal effects from the tubular.

Steps 705 and 707 constitute the main operational mode. Next, parameters of interest are estimated using the bucked signal at step 709. For example, an inversion of the differential (bucked) signal ΔS(t) may be done at step 709 giving a result that is substantially unaffected by the conductive pipe to find values of properties of the surrounding formation (e.g., resistivity properties). The property for which a value is estimated may include a formation resistivity, a formation conductivity, a formation dielectric constant, a distance to an interface such as water-oil contact, and/or a distance to an interface ahead of the drill formation. Optional step 711 may include using the property of the earth formation to conduct further operations in the earth formation. Step 711 may be carried out by modifying drilling operations in the borehole (e.g., geosteering) dependent upon one or more estimated values of the formation property (e.g., distance to interface).

Figure 8:
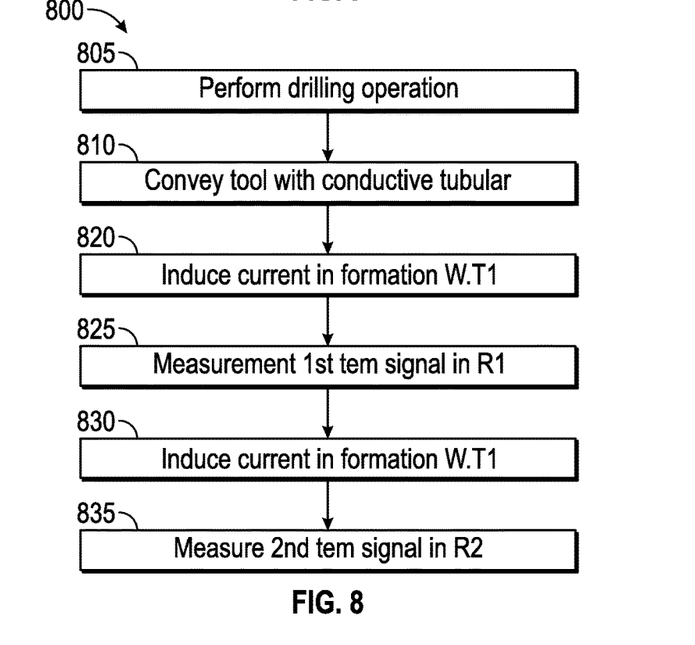
FIG. 8 illustrates a method for making a transient measurement in accordance with embodiments of the present disclosure.

FIG. 8 illustrates a method for making a transient measurement in accordance with embodiments of the present disclosure. Optional step 805 of the method 800 may include performing a drilling operation in a borehole. For example, a drill string may be used to form (e.g., drill) the borehole. Optional step 810 may include conveying a TEM tool 800 having a plurality of transmitters and a receiver on a conductive tubular in the borehole on a carrier. For example, a tool (e.g., tool 100) may be conveyed on the drill string.

Step 820 of the method 800 includes inducing a first current in the earth formation using a transmitter. This may be carried out by abruptly changing a magnetic moment of the transmitter in the borehole. Step 825 of the method 800 includes measuring with the first receiver a first time-dependent transient electromagnetic (TEM) signal induced by the formation responsive to the first current, which produces a first TEM measurement. The signal may be generated in the receiver (or indicative of the signal generated in the receiver) and caused by the formation responsive to the current.

Step 830 of the method 800 includes inducing a second current in the earth formation using the transmitter. This may be carried out by abruptly changing a magnetic moment of the transmitter in the borehole. Step 835 of the method 800 includes measuring with the second receiver a second time-dependent transient electromagnetic (TEM) signal induced by the formation responsive to the second current, which produces a second TEM measurement. The signal may be generated in the second receiver (or indicative of the signal generated in the receiver) and caused by the formation responsive to the current.

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

As used above, a processor is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

The conducting tubular as described above may be constructed from conductive materials or reduced conductivity materials. Conductive materials are defined as having a resistivity less than $10^{-5}$ ohm-meters (e.g., copper, silver, steel, etc.). Reduced conductivity materials may have a resistivity between $10^{-5}$ ohm-meters and $10^{-2}$ ohm-meters. Example reduced conductivity materials include composite materials, powdered metals, and so on. One specific type of composite materials includes carbon-reinforced composite materials. These materials have conductive carbon filaments embedded in their matrix material (e.g., resin), which makes them slightly conductive.

By "substantially free of parasitic signal effects" it is meant that the model with a pipe is within a tolerable deviation of the model without a pipe, wherein the deviation is sufficiently low to allow use of TEM signals generated in connection therewith to determine a value of a property of the formation ahead of the bit, examples of such deviation including, for example, less than 5 percent, less than 4 percent, less than 3 percent, less than 2 percent, less than 1 percent, and so on, down to and including zero difference.

The term "predominantly" relates to an amount of current induced in a depth of investigation in the earth formation relative to an amount of current induced in another depth in the earth formation. A predominantly greater amount of current induced in the depth of interest will provide a response of electromagnetic energy that can be related to a property of the earth formation at the depth of investigation. As used herein, the term "predominantly" relates at least to a minimum amount of increase in currents induced at the depth of investigation with respect to other depths, the minimum amount being necessary to be able to estimate a property of the earth formation at the depth of investigation from the response.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements by a processor may occur at the tool, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. An apparatus for estimating a value of a resistivity property of an earth formation intersected by a borehole, the apparatus comprising:
    an electrically conducting tubular conveyable in the borehole;
    at least one transmitter associated with the conducting tubular configured to propagate an electromagnetic field in the earth formation; and
    at least one receiver associated with the conducting tubular configured to receive an electromagnetic signal resulting from interaction of an electromagnetic field with said earth formation;
    wherein the at least one transmitter and at least one receiver employ at least one of a plurality of antenna assemblies on the conducting tubular, each antenna assembly comprising:
        a recess in the conducting tubular defined by a plurality of radially extending surfaces substantially perpendicular to a longitudinal axis of the conducting tubular and at least one non-radially extending surface;
        an antenna in the recess; and
        conductive shielding, the conductive shielding having a conductivity at least 30 times greater than a conductivity of the conducting tubular and comprising radially oriented conductive shielding covering the whole of each of the plurality of radially extending surfaces.

2. The apparatus of claim 1 wherein the conducting tubular comprises a downhole tool and the recess is defined by a first pair of radially extending surfaces proximate an outer radius of the tool and a second pair of radially extending surfaces proximate the non-radially extending surface.

3. The apparatus of claim 2 wherein the conductive shielding comprises a first pair of conductive shields covering the first pair of radially extending surfaces and a second pair of conductive shields covering the second pair of radially extending surfaces.

4. The apparatus of claim 1 wherein the antenna assembly further comprises a sleeve, the sleeve surrounding the antenna and cooperating with the conducting tubular to encapsulate the antenna.

5. The apparatus of claim 4 wherein the conductive shielding comprises a pair of conductive shields interior to the sleeve.

6. The apparatus of claim 5 wherein each of an other pair of circumferential conductive shields abuts and is unenclosed by the sleeve.

7. The apparatus of claim 1 comprising localized magnetic shielding on portions of at least one of the non-radially extending surfaces, the localized magnetic shielding comprising at least one of: i) magnetic material; and ii) highly magnetically permeable material; and wherein the antenna wraps around the localized magnetic shielding.

8. The apparatus of claim 7 wherein the conductive shielding comprises a conductive shield in an annulus between the conducting tubular and the localized magnetic shielding.

9. The apparatus of claim 7 wherein the conductive shielding covers all surfaces of the recess not covered by the localized magnetic shielding.

10. The apparatus of claim 1 further comprising at least one processor configured to: transiently activate the at least one transmitter to induce a current in the earth formation; receive a transient signal induced by the earth formation responsive to the current at the at least one receiver; estimate a parameter of interest of the formation using the transient signal.

11. The apparatus of claim 10 wherein the at least one processor is further configured to estimate the parameter of interest by performing an inversion using a 1-D model without using a representation of the conducting tubular.

* * * * *